R. E. KLETT.
BONE CLAMP.
APPLICATION FILED JULY 25, 1917.

1,302,176.

Patented Apr. 29, 1919.
9 SHEETS—SHEET 1.

Inventor
Robert E. Klett.
By Oscar Geier
his Attorney.

R. E. KLETT.
BONE CLAMP.
APPLICATION FILED JULY 25, 1917.

1,302,176.

Patented Apr. 29, 1919.
9 SHEETS—SHEET 3.

Inventor
Robert E. Klett.
By his Attorney
Oscar Guer

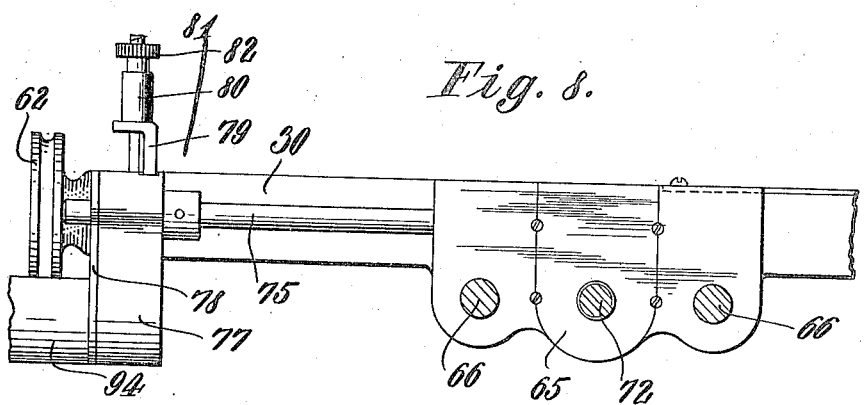
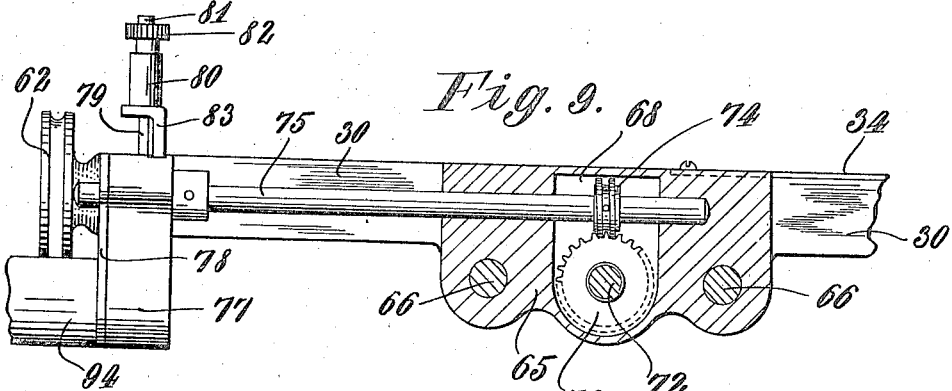
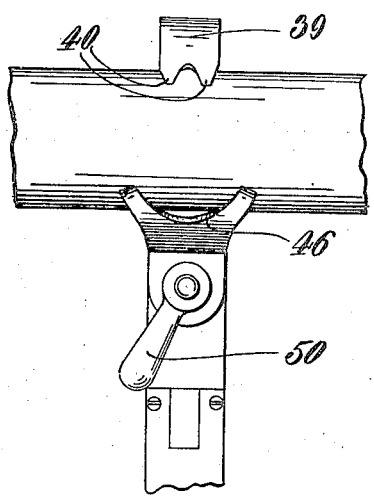
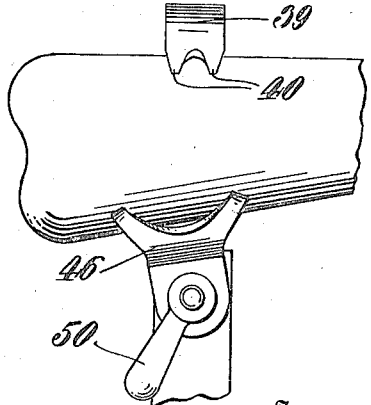

R. E. KLETT.
BONE CLAMP.
APPLICATION FILED JULY 25, 1917.
1,302,176.
Patented Apr. 29, 1919.
9 SHEETS—SHEET 5.
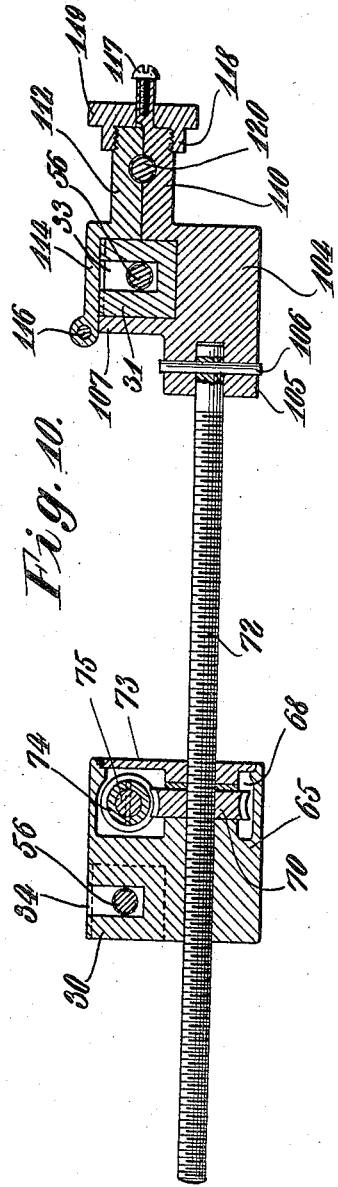
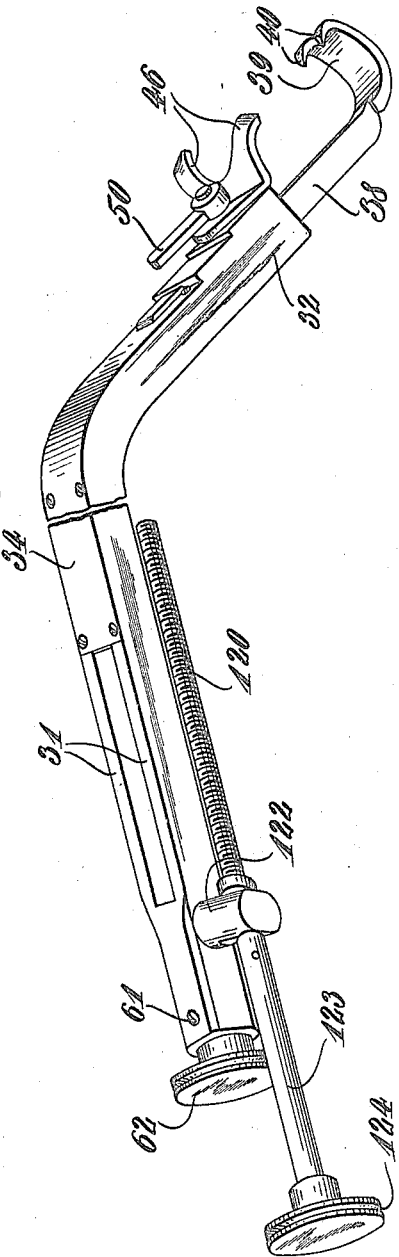
Inventor
Robert E. Klett.
By his Attorney
Oscar Geier

R. E. KLETT.
BONE CLAMP.
APPLICATION FILED JULY 25, 1917.

1,302,176.

Patented Apr. 29, 1919.
9 SHEETS—SHEET 6.

Inventor
Robert E. Klett.
By his Attorney
Oscar Geier

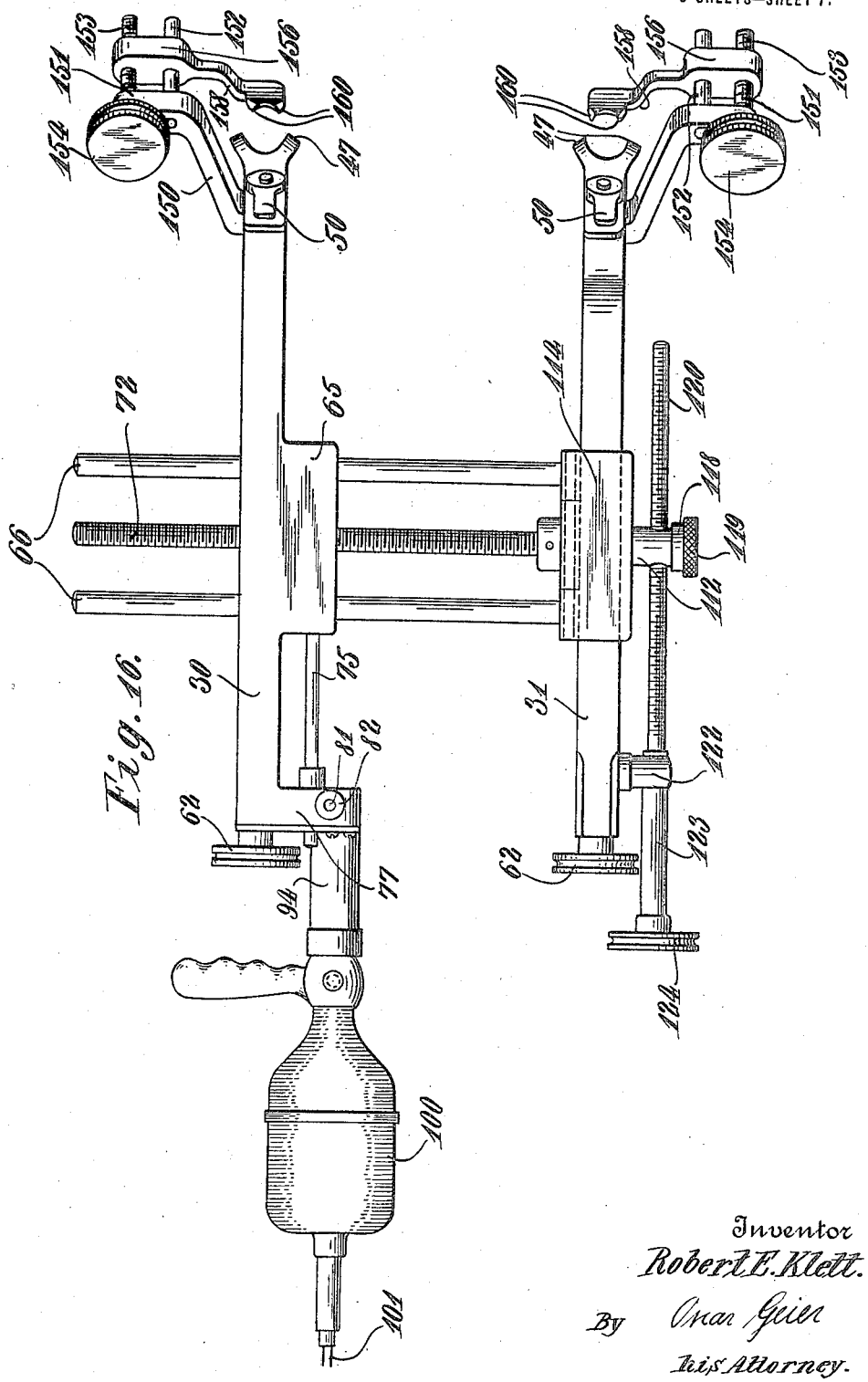

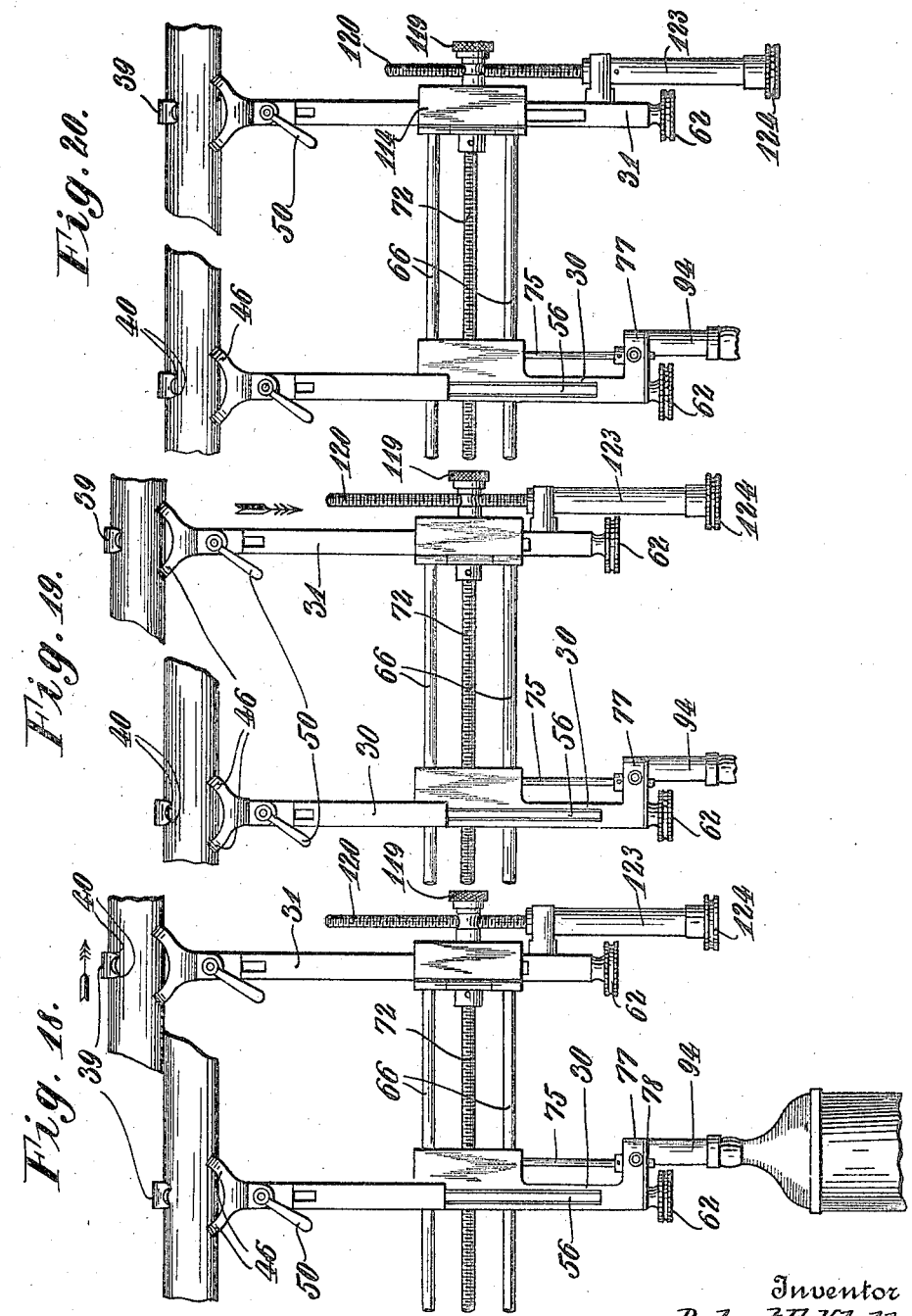

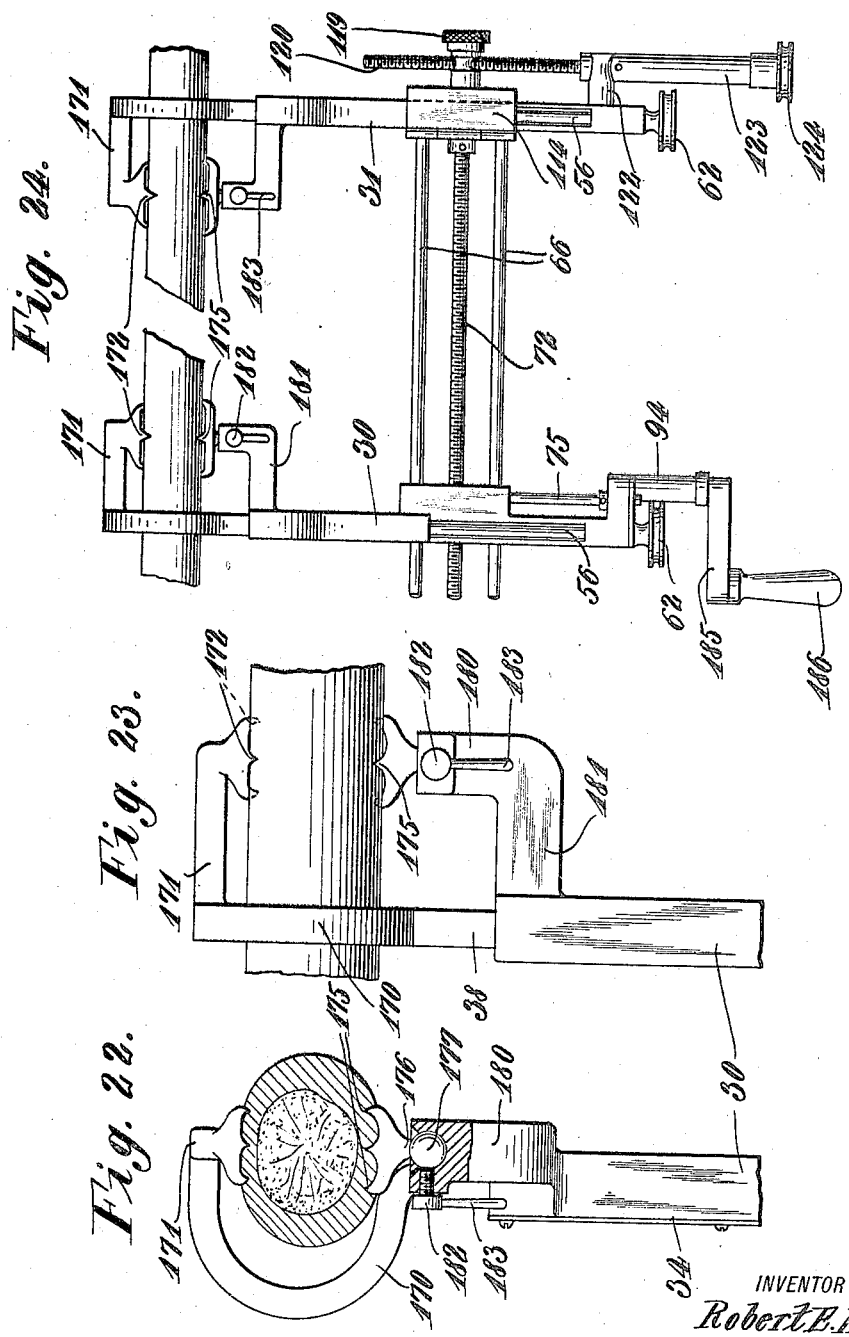

ated Apr. 29, 1919.
UNITED STATES PATENT OFFICE.

ROBERT E. KLETT, OF NEW YORK, N. Y., ASSIGNOR TO KLETT MANUFACTURING CO., INC., A CORPORATION OF NEW YORK.

BONE-CLAMP.

1,302,176.     Specification of Letters Patent.     Patented Apr. 29, 1919.

Application filed July 25, 1917. Serial No. 182,606.

*To all whom it may concern:*

Be it known that I, ROBERT E. KLETT, a subject of the Emperor of Germany, resident of New York, county of New York, and State of New York, have invented certain new and useful Improvements in Bone-Clamps, of which the following is a specification.

This invention relates to improvements in surgical instruments, and particularly to types employed in reducing bone fractures, adjusting and alining the parts, and in operations necessitating the removal of a section of the bone by mechanical means.

The principal object of the invention is to provide means whereby the broken ends of a bone may each be firmly grasped in such manner as to avoid slipping, the clamping device providing means whereby the bone ends may be moved laterally, one part with reference to the other, as well as longitudinally, the bones being under perfect and ready control of the operator.

Another object is to provide mechanical means combined with the device which will permit the use of motive power in extending or separating the broken portions of a bone, one from the other, and for bringing the parts into close intimate contact.

A still further object is to provide clamping devices in forms which may be separately attached and afterward combined in a single operative body, the claws making contact with the bones being particularly suited to grasp the same in an effective manner.

These and other like objects are attained by the novel design, construction and combination of parts hereafter described and shown in the accompanying drawings, forming a material part of this disclosure, and in which—

Fig. 4 is a partial side elevational view, showing the rear of the implement and motor combined therewith, parts being removed in order to show the construction.

Fig. 5 is a transverse sectional view taken on line 5—5 of Fig. 4.

Fig. 6 is a transverse sectional view taken on line 6—6 of Fig. 4.

Fig. 7 is a similar view to Fig. 6, the parts being shown in another position.

Fig. 8 is a fragmental vertical sectional view taken on line 8—8 of Fig. 3.

Fig. 9 is a similar view to Fig. 8, parts being removed in order to show the interior.

Fig. 10 is a transverse sectional view taken on line 10—10 of Fig. 3.

Fig. 11 is a perspective view showing one of the clamps dismounted from its mate.

Fig. 14 is a top plan view of the same.

Fig. 15 is a similar top plan view showing the clamp as applied to a bone of tapering structure.

Fig. 16 is a top plan view of the implement showing a modified form of construction with relation to the gripper elements.

Fig. 18 is a reduced top plan view illustrating the application of the implement to a bone, the portions of which are off-set, and extended one past the other.

Fig. 19 is a similar view of the same, showing the bone portions as separated longitudinally.

Fig. 20 is a similar view indicating the final action of the implement in adjusting the bone ready for splints or other operation.

Fig. 21 is a transverse sectional view taken on line 21—21 of Fig. 2.

Fig. 22 is a fragmental side elevational view showing a further modification in construction of the bone clamp or claws.

Fig. 23 is a top plan view of the same, and

Fig. 24 is a top plan view showing an embodiment of the invention embracing the modified jaws, and means for manually spreading the same.

Figure 1:
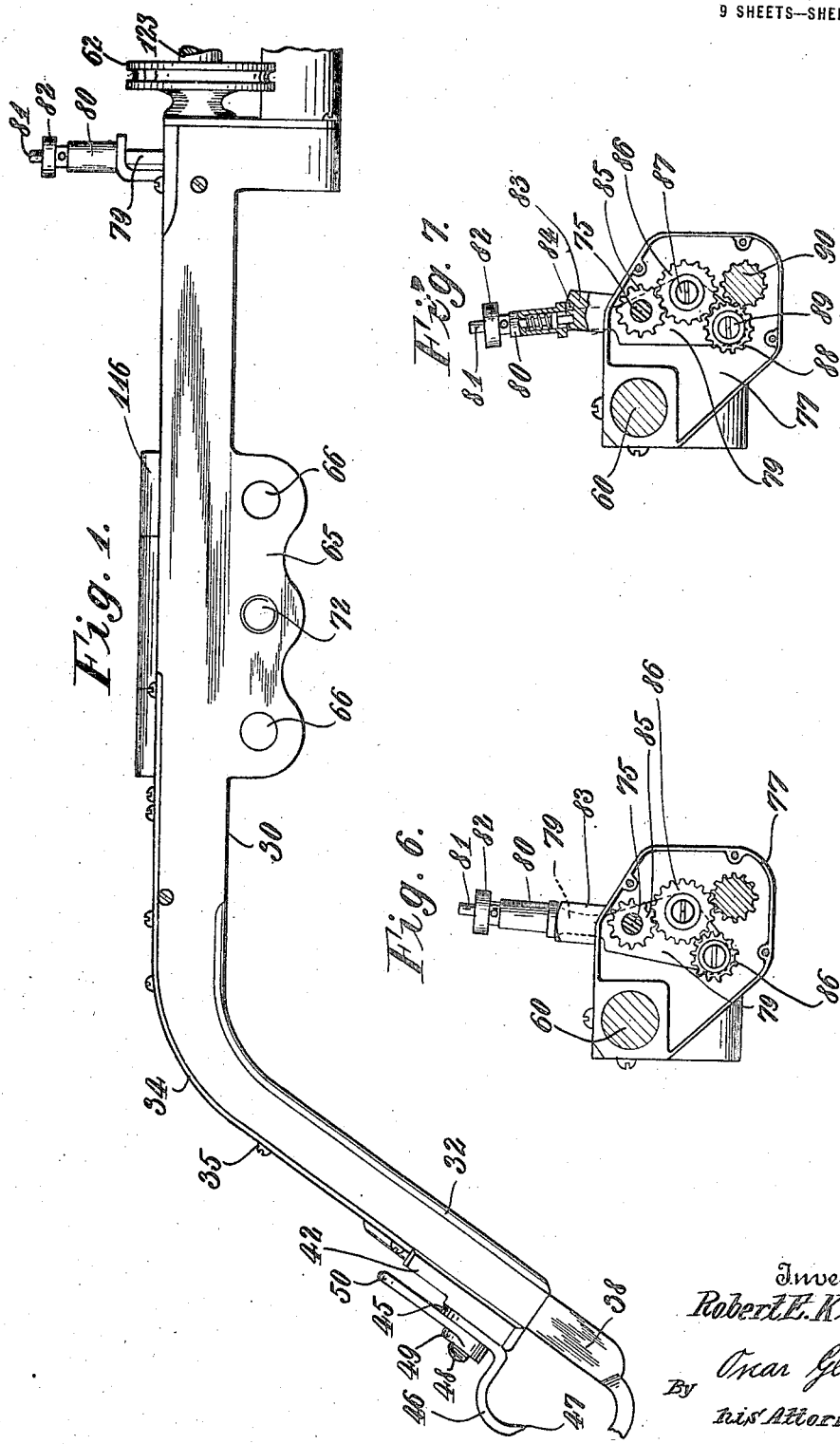
Figure 1 is a side elevational view of an apparatus, made in accordance with the invention.
Figure 2:
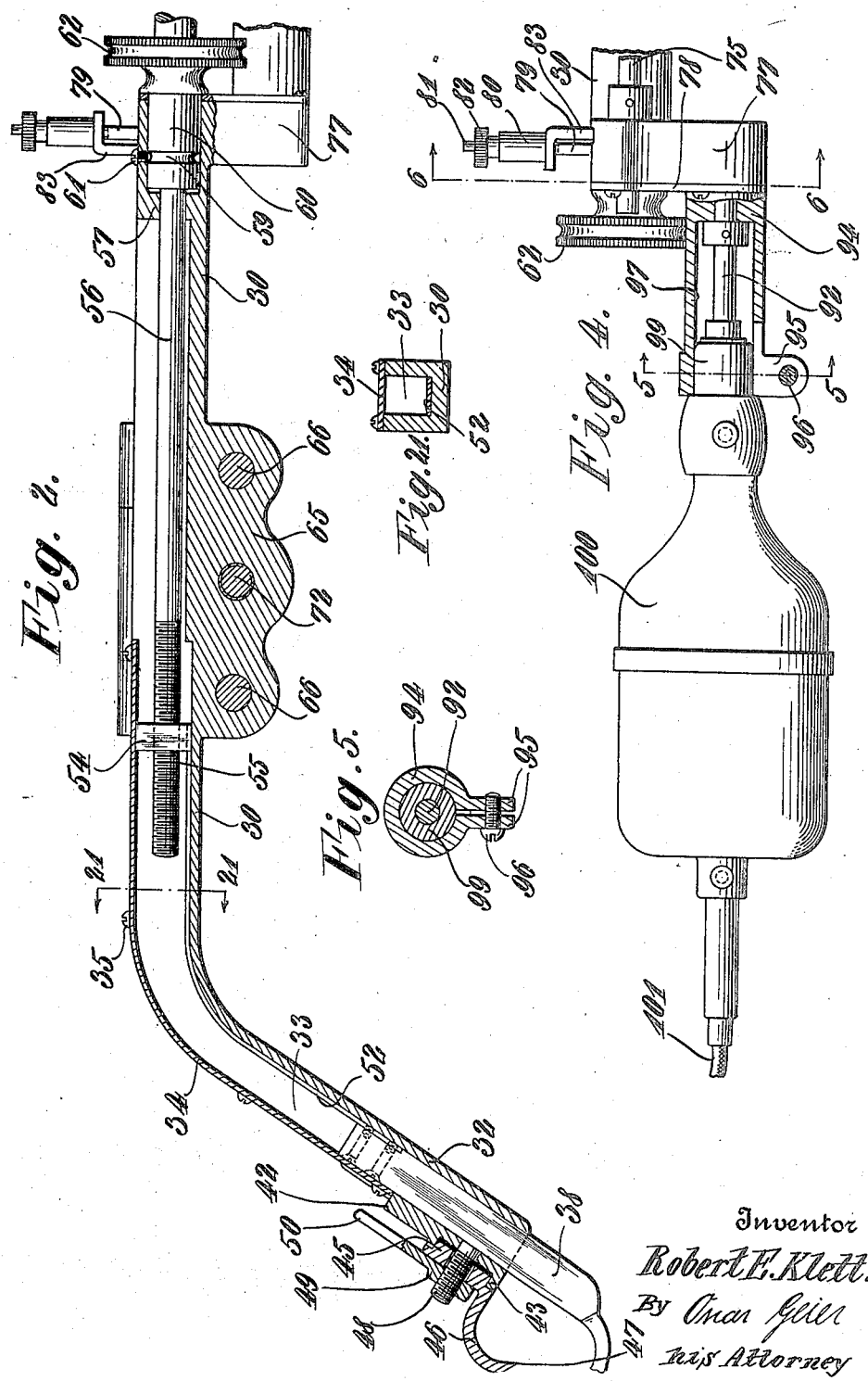
Fig. 2 is a longitudinal sectional view of the same.
Figure 3:
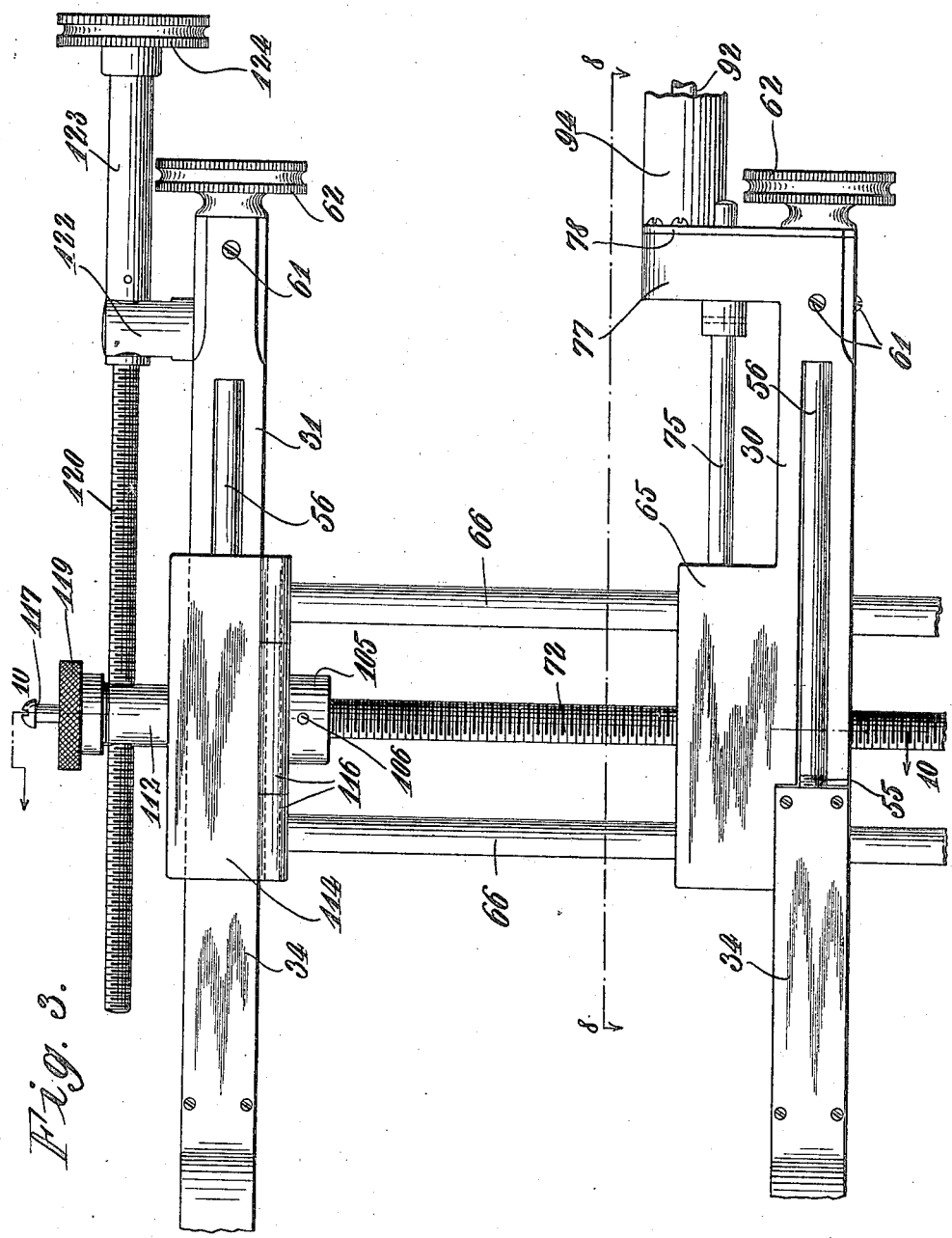
Fig. 3 is a fragmental top plan view of the entire instrument as operatively assembled.
Figure 12:
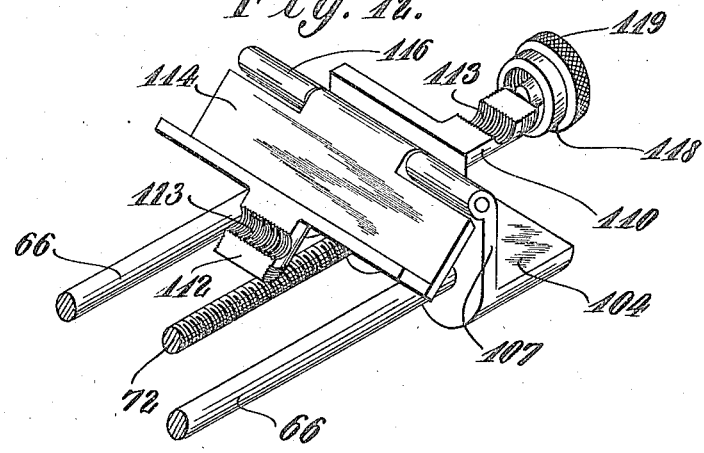
Fig. 12 is a perspective view of the clamp holder.
Figure 13:
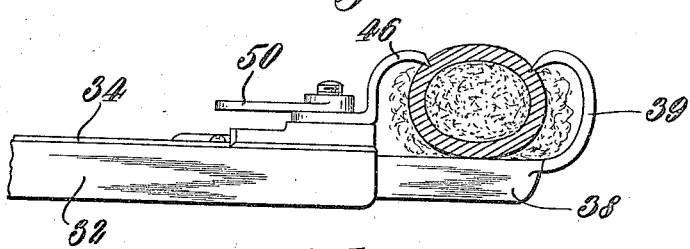
Fig. 13 is a fragmental side view showing the application of one form of the clamp to a bone.

The instrument includes two guide bars 30 and 31, curved downwardly at their front ends 32, and containing a longitudinal groove or recess 33, normally covered by a bent plate 34, removably secured by screws 35, there being slidably engaged in the extreme front outer end of the guide bars, plungers 38, terminating in rigid claws 39, ending in spaced, sharp points 40.

Formed upon the outer upper side of the curved extensions 32, which are bent substantially at an angle of 65 degrees from the main portion, are raised blocks 42, containing annular recesses 43, the same acting as seats for the circular bottoms 45, of other claws 46, terminating in points 47, the same being clamped in adjusted position by means of the bolts 48, secured in the thickened extensions 42, in connection with nuts 49, having operating handles 50.

Attached to the plungers 38 are flexible metallic strips 52, the same extending through the slots 33, to sliding blocks or nuts 54, to which they are rigidly engaged, the blocks being operable by means of the screws 55, the stems 56 of which are guided by the bearings 57, formed at the rear of the guide bars 30 and 31, and held against longitudinal movement by means of the recesses 59 formed in the enlarged heads 60 to which are secured the actuating knobs 62, the knobs projecting outward beyond the bars as indicated, the screws 61, arranged in the bars so that their points enter the annular grooves 59, preventing the screws from moving outward.

Midway of the guide bars 30 is a lateral enlargement 65, in which are formed two parallel bearings receptive of the guide rods 66, while in the same plane and centrally therebetween is an opening 68, containing a worm gear 70 having a screw-threaded axial bore receptive of the screw 72, the interior of the opening making close contact with the sides of the worm gear in such manner as to be prevented from lateral movement; this worm gear is driven by a worm 74, secured to a spindle 75, the spindle being mounted longitudinally in the enlargement 65, and held therein by a cover plate 73.

Carried at the rear of the guide bar 30 is a hollow extending casing 77, having a cover 78 through which the spindle 75 passes, and upon the latter is oscillatably mounted a plate 79, having an extending stem, carrying on its bent upper portion a sleeve 80. in which is slidably engaged a pin 81, operated by the knob 82, the lower end of the pin engaging in one of the two openings 84, formed in the extending element 83 secured to the casing, the arrangement being such that the plate 79 may be shifted upon the axial spindle 75.

Rigidly secured upon the spindle 75 is a spur pinion 85, meshing with a spur gear 86, rotatable on the stud 87, carried by the plate 79, and engaged with the gear 86 is another spur pinion 88 carried upon the stud 89, mounted in the plate 79, both of the gears 86 and 88 being engageable with a driving pinion 90, secured on a shaft 92, mounted in a sleeve 94, formed with the cover 78 of the casing 77.

The outer end of the sleeve 94 is formed with a pair of lugs 95, having an open slot between them, and which may be clamped together by the clamp screw 96, so as to rigidly engage within the bore 97, of the sleeve 94, a plug 99 by means of which the motor 100 is supported, the motor being of the inclosed type and driven by electrical connections 101, in the ordinary manner.

By reason of the gearing as described, it is possible to rotate the spindle 75 in either direction and hence cause the internally threaded worm wheel 70 to move the screw 72, thereby moving the guide bars either toward or from each other.

A holder 104, receptive of the guide bar 31, has an extension 105, in which the end of the screw 72 is rigidly held by a pin 106, and an oppositely disposed semi-cylindrical extension 110, a like extension 112 being formed with the cap 114, connected to the holder element 107 by hinges 116, there being a screw-threaded transverse central opening 113 between the two contacting sides of the projections 110 and 112, in which is engaged a screw 120, the two extensions being rigidly clamped together by means of the nut 118, suited to the screw-threaded ends of the extensions and provided with knurled head 119 by which it may be operated, a set screw 117 preventing the nut from coming entirely off the lower extension 110 when the upper extension 112 is released.

The screw 120 is rotatably engaged in an extending stud 122, secured to the outer rear side of the guide 31, and has secured over it a sleeve 123, terminating in a knurled adjusting knob 124, by means of which the screw may readily be turned and by its engagement with the nut formed between the extensions 110 and 112 of the holder 104 advance or retract the guide 31 with relation to the holder, the guide sliding freely therethrough.

Thus the guide bar 31 may be operatively applied independently, and after having made a secure grip upon the bone, the other guide bar 30 may be attached by means of the holder as described.

Figure 17:
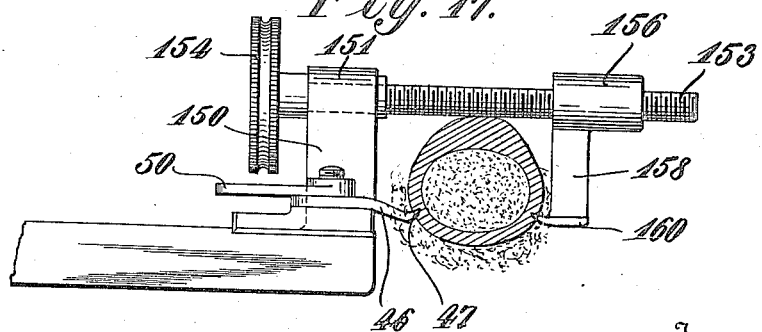
Fig. 17 is a fragmental side elevational view showing the grippers as used in the modification.

In the adaptation shown in Figs. 16 and 17, there is attached to the plungers 38, bars 150, having out-turned heads 151, in one part of which is rigidly secured guide rods 152, while in the opposite end of the heads are screws 153, operated by the knurled knobs 154, the screws engaging within jaws 156, slidable on the rods 152, and having down-turned stem portions 158, formed with sharpened prongs 160, operable in connection with the prongs 47, pivotally secured to the guide bars in the manner before described.

In the adaptation shown in Figs. 22 and 24, there is formed with the plungers 38 arcuate extensions 170, the same being adapted to partially encircle the bone to which the apparatus is applied and ending in arms 171, turned laterally outward to some distance and in opposite directions so as to clear the immediate vicinity of the fracture, the arms being provided with claws 172, opposed to which are similar claws 175, the stems 176 of which are formed with spheres 177, engaged in suitable recesses and in which they may move limitedly, the recesses being at the end of bent arms 180, extending from brackets 181 affixed to the guide bars, so that the claws 175 are free to move in conformity with the shape of the bone against which they are pressed and which can be clamped in adjusted position by means of the screw 182, operated by the extending handle 183.

In order to avoid the untoward occurrence of loss of electric power, at a moment when an operation is under way, the motor 100 can be instantly removed by loosening the clamp screw 96 and a crank arm 185, having an operating handle 186 applied, the former being adapted for manual actuation in an obvious manner.

From the foregoing it will be seen that an instrument has been disclosed provided with claws which can be applied to the broken ends of a fractured bone, either when in a completely assembled position, or the guide bars separately applied as indicated best in Fig. 11, and that the clamping elements or claws are conformable to the shape of a bone, which may be tightly grasped by the actuation of the extending knurled knobs 62, after which the two guide bars may be moved apart by power applied to the worm gear on the screw 72, the ends of the bone being alined by actuating the screw 120, whereby the bars are moved longitudinally, one with respect to the other, and finally that the ends of the bone may be held tightly together by again actuating the gearing.

Having thus described my invention, what I claim as new and desire to secure by Letters Patent, is—

1. In a bone clamp, the combination with a pair of rigid bars having one end bent at an angle and containing a longitudinal slot, of a claw pivotally engaged with the end of said bars, means for clamping said pivoted claws in an adjusted position, plungers slidable in the mentioned slots, claws formed at the extremities of said plungers, said claws opposing the first named claws, means for actuating said plungers whereby the opposed pairs of claws are brought to or from each other, a holder slidably engaging one of said bars, a plurality of rods extending from said holder, slidably engaged with the other of said bars, extensions formed with said holder, means for clamping said extensions rigidly together, and a screw operatively combined with said extensions whereby the bar engaged in the holder may be moved longitudinally with relation thereto.

2. In a bone clamp, the combination with a pair of rigid bars having one end bent at an angle and containing a longitudinal slot, of a claw rotataby engaged with the end of said bars, means for clamping said claws in an adjusted position, plungers slidable in the mentioned slot, claws formed at the extremities of said plungers, said claws opposing the first named claws, means for actuating said plungers whereby the opposed pairs of claws are brought to or from each other, a holder slidably engaging one of said bars, a plurality of rods extending from said holder, slidably engaged with the other of said rigid bars, semi-cylindrical extensions formed with said holder, means for clamping said extensions rigidly together, a screw operatively combined with said extensions whereby the bar engaged in said holder may be moved longitudinally with relation thereto, a screw rigidly engaged in said holder extending parallel with said rods, a nut revolubly mounted in the first named bar, engageable with said screw, a power operated means for actuating said nut, and means for changing the direction of rotation of said nut.

3. In a bone clamp, the combination with a pair of rigid bars having bone gripping elements at one end thereof, and means for opening or closing said bone gripping elements, of a motor carried by one of said bars, a worm driven by said motor, rods upon which said bars are slidably mounted, a screw mounted between said rods, a worm gear having an internal screw thread engaged with said screw, said worm gear being actuated by said worm, and through which said bars may be drawn to or from each other, means for disengaging one of said bars from said rods, and means for sliding the other of said fixed bars with relation to said rods.

4. In a bone clamp, the combination with a pair of parallel rigid bars having gripping elements at their ends, of means for actuating said gripping elements to or from each other, guide rods upon which said bars are slidably mounted, a holder rigidly engaged with said guide rods in which the other of said rigid bars is slidably mounted, a spit nut formed with said holder, a screw operative in said nut, means for clamping said nut in operative position, a stud engaged with one of said bars, in which said screw is operatively engaged, means for actuating said screw whereby one of said bars is projected or retracted relative to the other of said bars, and means for adjusting the distance between said fixed bars.

In testimony whereof I have affixed my signature.

ROBERT E. KLETT.

Copies of this patent may be obtained for five cents each, by addressing the "Commissioner of Patents, Washington, D. C."